US011359493B2

(12) United States Patent
Phelps et al.

(10) Patent No.: US 11,359,493 B2
(45) Date of Patent: Jun. 14, 2022

(54) LOW SPEED FAN UP CAMBER (71) Applicant: ROLLS-ROYCE plc, London (GB)

(72) Inventors: Benedict R. Phelps, Derby (GB); Stephane M M Baralon, Derby (GB); Mark J. Wilson, Kirby-in-Ashfield (GB)

(73) Assignee: ROLLS-ROYCE PLC, London (GB)

( * ) Notice: Subject to any disclaimer, the term of this patent is extended or adjusted under 35 U.S.C. 154(b) by 0 days.

(21) Appl. No.: 17/352,468

(22) Filed: Jun. 21, 2021

(65) Prior Publication Data

US 2021/0404342 A1 Dec. 30, 2021

(30) Foreign Application Priority Data

Jun. 30, 2020 (GB) ..................................... 2009933

(51) Int. Cl.
*F01D 5/14* (2006.01)
*F02K 3/06* (2006.01)

(52) U.S. Cl.
CPC ................ *F01D 5/141* (2013.01); *F02K 3/06* (2013.01); *F05D 2220/36* (2013.01); *F05D 2240/301* (2013.01); *F05D 2240/303* (2013.01); *F05D 2240/306* (2013.01); *F05D 2250/70* (2013.01)

(58) Field of Classification Search
CPC ... F01D 5/14; F01D 5/141; F03K 3/06; F05D 2220/36; F05D 2240/301; F05D 2240/303; F05D 2240/306; F05D 2250/70
See application file for complete search history.

(56) References Cited

U.S. PATENT DOCUMENTS

| 2008/0118362 | A1* | 5/2008 | Hu .......................... F04D 21/00 416/223 A |
| 2016/0076380 | A1 | 3/2016 | Van et al. |
| 2017/0167503 | A1* | 6/2017 | Gallagher ............. F04D 29/325 |
| 2019/0063369 | A1* | 2/2019 | Phelps ..................... F02K 3/06 |
| 2019/0162071 | A1* | 5/2019 | Wilson .................... F01D 5/141 |

FOREIGN PATENT DOCUMENTS

| EP | 3378780 A1 | 9/2018 |
| EP | 3489461 A2 | 5/2019 |
| EP | 3489462 A2 | 5/2019 |
| EP | 3656980 A1 * | 5/2020 ............. F01D 5/141 |
| WO | 2015126774 A1 | 8/2015 |
| WO | 2015175044 A2 | 11/2015 |

OTHER PUBLICATIONS

European search report dated Nov. 18, 2021, issued in EP Patent Application No. 21177446.
Great Britain search report dated Dec. 4, 2020, issued in GB Patent Application No. 200933.9.

* cited by examiner

*Primary Examiner* — Juan G Flores
*Assistant Examiner* — Joshua R Beebe (57) ABSTRACT

A fan blade for a gas turbine engine has a covered passage. A cross section through the fan blade at a point along the blade span is defined as having particular change in angle ($\alpha 3 - \alpha 1$) of the camber line between the leading edge and the trailing edge and/or between the leading edge and the point on the camber line that corresponds to the start of the covered passage.

11 Claims, 5 Drawing Sheets

SECTION A-A

LOW SPEED FAN UP CAMBER

CROSS-REFERENCE TO RELATED APPLICATIONS

This specification is based upon and claims the benefit from United Kingdom patent application number GB 2009933.9 filed on Jun. 30, 2020, the entire contents of which is incorporated herein by reference.

BACKGROUND

Technical Field

The present disclosure relates to a fan blade for a gas turbine engine. Aspects of the disclosure relate to the camber distribution of the fan blades of a gas turbine engine.

Description of the Related Art

Modern gas turbine aero-engines typically comprise a fan, which compresses the incoming air and directs at least a portion of that air along a bypass duct, with the remainder of the air flowing through the engine core.

Conventionally, gas turbine engines have been developed so as to provide a fan that operates a maximum efficiency when the gas turbine engine is operating at cruise conditions, because this is the condition at which the engine operates for the longest period during a flight cycle. As such, conventional engines have been designed so as to optimize the peak efficiency of the fan at cruise conditions, with little or no motivation to consider the performance of the fan at cruise away from the peak efficiency operating point.

However, in designing the engine to have optimum efficiency, the present inventors have understood that other aspects of engine performance may be compromised. One such aspect may be fan operability, for example fan blade flutter margin and/or fan stall margin.

Flutter may be characterized as a self-excited vibration. When the aerofoils in a blade row (such as the fan blades in a gas turbine engine fan) vibrate, they generate unsteady aerodynamic forces on the blade row itself. Under most conditions, these unsteady aerodynamic forces cause the blade row to do work on the surrounding air, and the vibrations decay in amplitude. However, at certain operational conditions (for example certain rotational speeds and/or thrusts and/or combinations thereof), the surrounding air can do work on the fan itself. If the work done by the air exceeds the work (for example by mechanical damping), then the vibrations will grow. This instability is known as flutter. Flutter is undesirable because it can generate large stresses in an engine.

Accordingly, it is desirable to provide an engine with improved overall performance, for example high overall efficiency combined with low susceptibility to flutter and/or stall.

SUMMARY

In a first aspect there is provided a fan blade for a gas turbine engine, wherein the fan blade comprises: an aerofoil portion having a leading edge extending from a root to a tip, each fan blade has a radial span (m) extending between the leading edge at the root at a 0% span position and to the leading edge at the tip at a 100% span position; a camber line defined by the midpoint between its pressure surface and its suction surface, with a true chord (C) being defined as the distance along the camber line between a leading edge and a trailing edge of the fan blade; and a covered passage defined as the portion of the cross-section between the trailing edge and a line (J) passing through a point (K) on the suction surface that is closest to the leading edge of a neighbouring fan blade and the leading edge of that neighbouring fan blade; wherein: at a cross section through the fan blade at a point 80% of the blade span of the airfoil portion the change in angle ($\alpha 3-\alpha 1$) of the camber line between the leading edge and the trailing edge satisfies:

$$|\alpha 3-\alpha 1|>20°$$

and at a cross section through the fan blade at a point 80% of the blade span of the airfoil portion the change in angle ($\alpha 2-\alpha 1$) of the camber line between the leading edge and the point on the camber line that corresponds to the start of the covered passage satisfies:

$$|\alpha 2-\alpha 1|>7°$$

In a second aspect there is provided a gas turbine engine for an aircraft, the gas turbine engine comprising: an engine core comprising a turbine, a compressor, and a core shaft connecting the turbine to the compressor; a fan located upstream of the engine core, the fan comprising a plurality of fan blades according to the first aspect; and a gearbox that receives an input from the core shaft and outputs drive to the fan so as to drive the fan at a lower rotational speed than the core shaft.

Reference to a cross-section through the blade may mean a section through the blade in a plane defined by: a line that passes through the point on the leading edge that is at a given percentage of the span along the leading edge from the leading edge root and points in the direction of the tangent to the circumferential direction at that point on the leading edge; and a point on the trailing edge that is at that same percentage along the trailing edge from the trailing edge root. The radial span (m) may be taken to extend from a root at a 0% span position to a tip at a 100% span position. The root may be the radially innermost gas-washed part of the blade. The tip may be the radially outermost gas-washed part of the blade. In other disclosures, this radially innermost gas-washed part of the blade may be referred to as the hub.

It is the absolute change in angle of the camber line that is important, and so the magnitude of the difference ($|\alpha 3 - \alpha 1|$, $|\alpha 2-\alpha 1|$) is used throughout, such that a reference line in the cross-section against which the angles are measured is not important. The angle of the camber line is measured in degrees (°). Typically, the camber line may become more aligned with the axial direction as it progresses from leading edge to trailing edge. However, it will be appreciated that this need not be the case for all cross-sections. Purely by way of example, for some (but not all) blades, at or towards the hub the camber line may pass through the axial direction, such that the leading edge of the camber line and the trailing edge of the camber line point in different directions away from the axial direction.

The covered passage may be referred to as the suction surface covered passage, because it is the part of the blade defined by a line drawn from the suction surface to the leading edge of an equivalent cross-section through a neighbouring blade (the neighbouring blade being the neighbouring blade that is adjacent the suction surface of the blade in question). The equivalent cross-section may be defined as the cross-section of the neighbouring (or adjacent) blade that is at the same percentage span.

The line pointing away from the suction surface to the leading edge of the neighbouring blade may include a component in the circumferential direction of the gas turbine engine to intersect the equivalent cross-section of the adjacent blade. The line may appear to be a straight line when viewed from the radial direction (see line J in FIG. 5 by way of example, discussed in greater detail below).

Optionally, at a cross section through the fan blade at a point 80% of the blade span of the airfoil portion (130) the change in angle ($\alpha 3-\alpha 1$) of the camber line (142) between the leading edge (136) and the trailing edge (138) satisfies:

$$32°>|\alpha 3-\alpha 1|>20°$$

Optionally, at a cross section through the fan blade at a point 80% of the blade span of the airfoil portion (130) the change in angle ($\alpha 3-\alpha 1$) of the camber line (142) between the leading edge (136) and the trailing edge (138) satisfies:

$$29°>|\alpha 3-\alpha 1|>20°$$

Optionally, at a cross section through the fan blade at a point 80% of the blade span of the airfoil portion (130) the change in angle ($\alpha 2-\alpha 1$) of the camber line (142) between the leading edge (136) and the point on the camber line that corresponds to the start of the covered passage (143) satisfies:

$$15°>|\alpha 2-\alpha 1|>7°$$

Optionally, at a cross section through the fan blade at a point 80% of the blade span of the airfoil portion (130) the change in angle ($\alpha 2-\alpha 1$) of the camber line (142) between the leading edge (136) and the point on the camber line that corresponds to the start of the covered passage (143) satisfies:

$$10°>|\alpha 2-\alpha 1|>7°$$

For cross section through the fan blade at a height greater than 80% of the blade span of the airfoil portion (130) the angle ($\alpha 3-\alpha 1$) of the camber line (142) between the leading edge (136) and the trailing edge (138) satisfies:

$$|\alpha 3-\alpha 1|\geq -0.5*\text{cross section percentage height}+60°$$

Optionally, at a cross section through the fan blade at a height greater than 80% of the blade span of the airfoil portion (130) the angle ($\alpha 3-\alpha 1$) of the camber line (142) between the leading edge (136) and the trailing edge (138) satisfies:

$$-0.2*\text{cross section percentage height}+48°\geq |\alpha 3-\alpha 1|\geq -0.5*\text{cross section percentage height}+60°$$

Optionally, at a cross section through the fan blade at a height greater than 80% of the blade span of the airfoil portion (130) the angle ($\alpha 3-\alpha 1$) of the camber line (142) between the leading edge (136) and the trailing edge (138) satisfies:

$$|\alpha 3-\alpha 1|\geq -0.3*\text{cross section percentage height}+44°$$

Optionally, at a cross section through the fan blade at a height greater than 80% of the blade span of the airfoil portion (130) the angle ($\alpha 3-\alpha 1$) of the camber line (142) between the leading edge (136) and the trailing edge (138) satisfies:

$$-0.4*\text{cross section percentage height}+64°\geq |\alpha 3-\alpha 1|\geq -0.3*\text{cross section percentage height}+44°$$

The gas turbine engines and/or fan blades described and/or claimed herein (for example having the camber distributions described and/or claimed herein) may provide improved operability (for example in terms of susceptibility to flutter and/or stall) compared with conventional designs. This may allow the use of more competitive engine cycles, for example requiring less compromise for stall and flutter.

At least some of the fan blade arrangements described and/or claimed herein may be said to have increased camber in the region upstream of the covered passage. This may allow reduced camber in the covered passage region of the blade in order to achieve the same overall flow turning (or overall camber). Towards stall of the blade, this may result in the flow more closely following the blade shape towards the trailing edge and/or a healthier boundary layer towards the trailing edge, which may be better able to resist separation. This, in turn, may provide improved operability, such as improved stall margin and/or less susceptibility to flutter.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38, 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all values J/kg/((m/s)^2)). The fan tip loading may be in an inclusive range bounded by any two of the values in the previous sentence (i.e. the values may form upper or lower bounds), for example in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of form 12 to 16, 13 to 15, or 13 to 14. The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds), for example in the range of from 80 $Nkg^{-1}s$ to 100 $Nkg^{-1}s$, or 85 Nkg$^{-1}$s to 95 Nkg$^{-1}$s. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example, at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent. Cruise conditions thus define an operating point of, the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached.

Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION OF THE DISCLOSURE

Aspects and embodiments of the present disclosure will now be discussed with reference to the accompanying figures. Further aspects and embodiments will be apparent to those skilled in the art.

Figure 1:
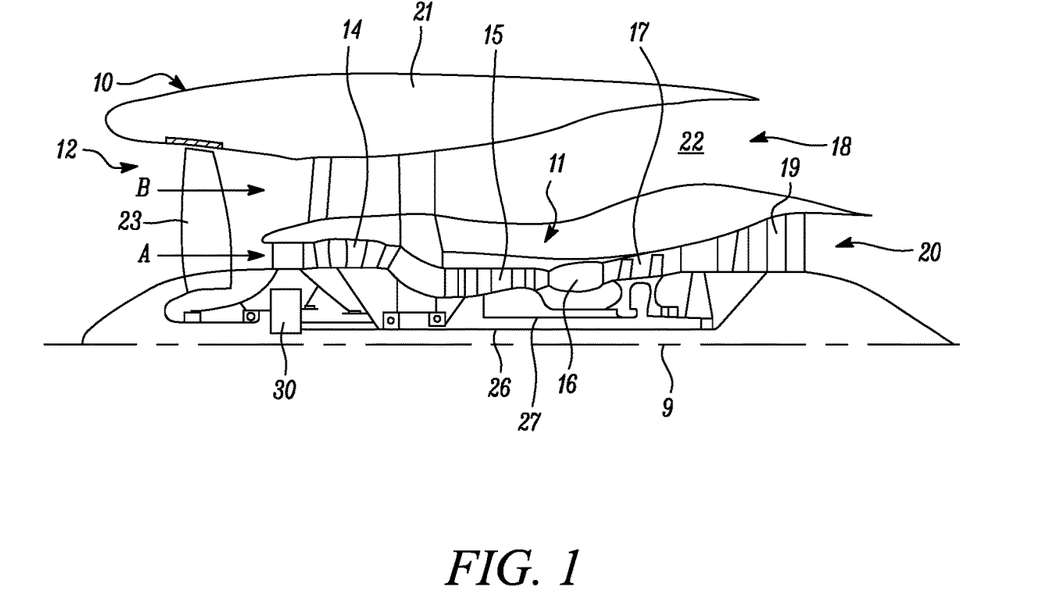
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
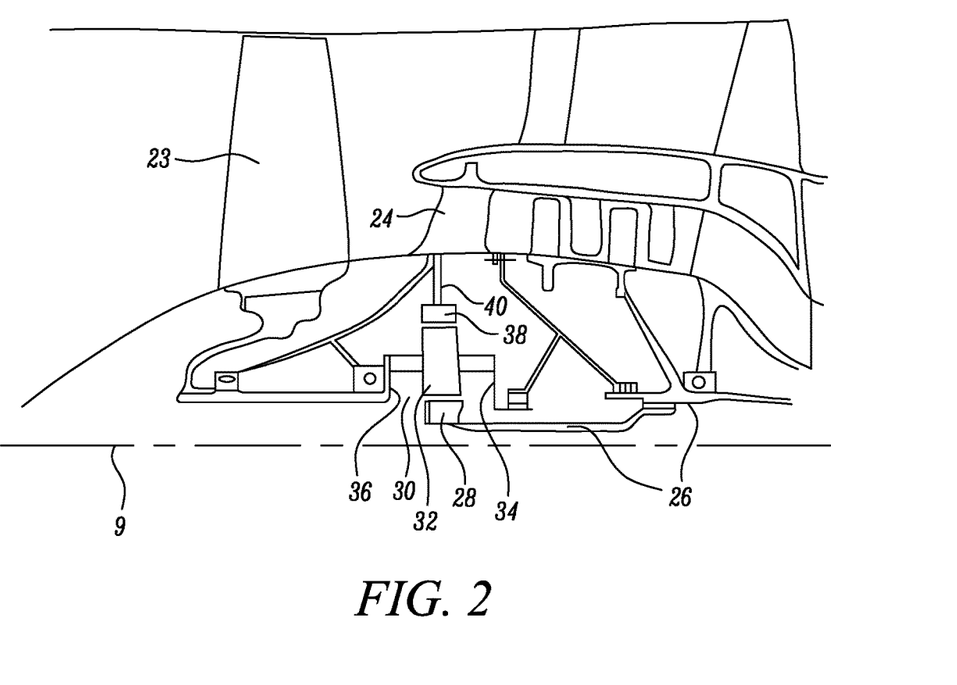
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor"

referred to herein may alternatively be known as the "intermediate pressure turbine" and "intermediate pressure compressor". Where such alternative nomenclature is used, the fan 23 may be referred to as a first, or lowest pressure, compression stage.

Figure 3:
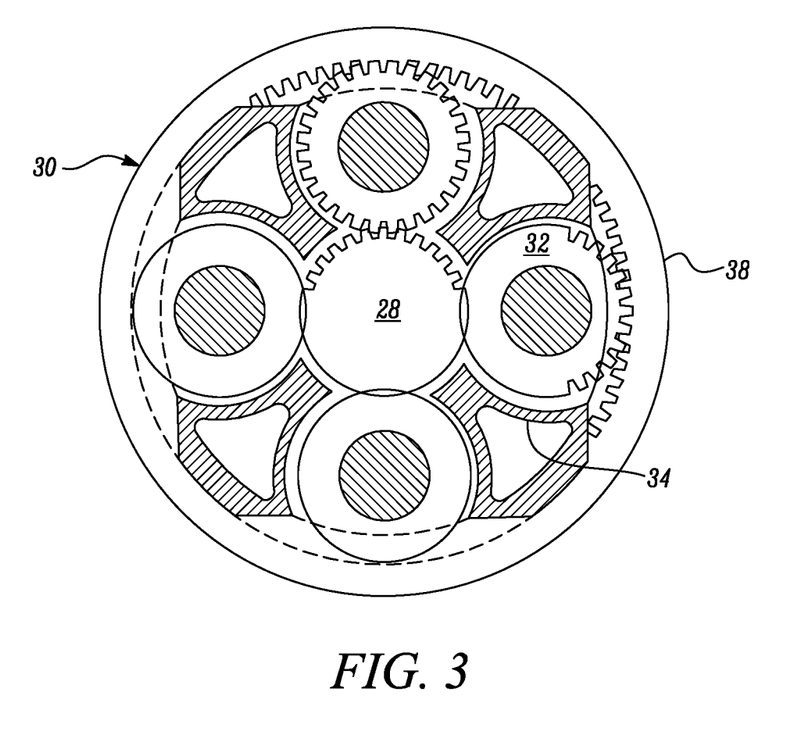
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
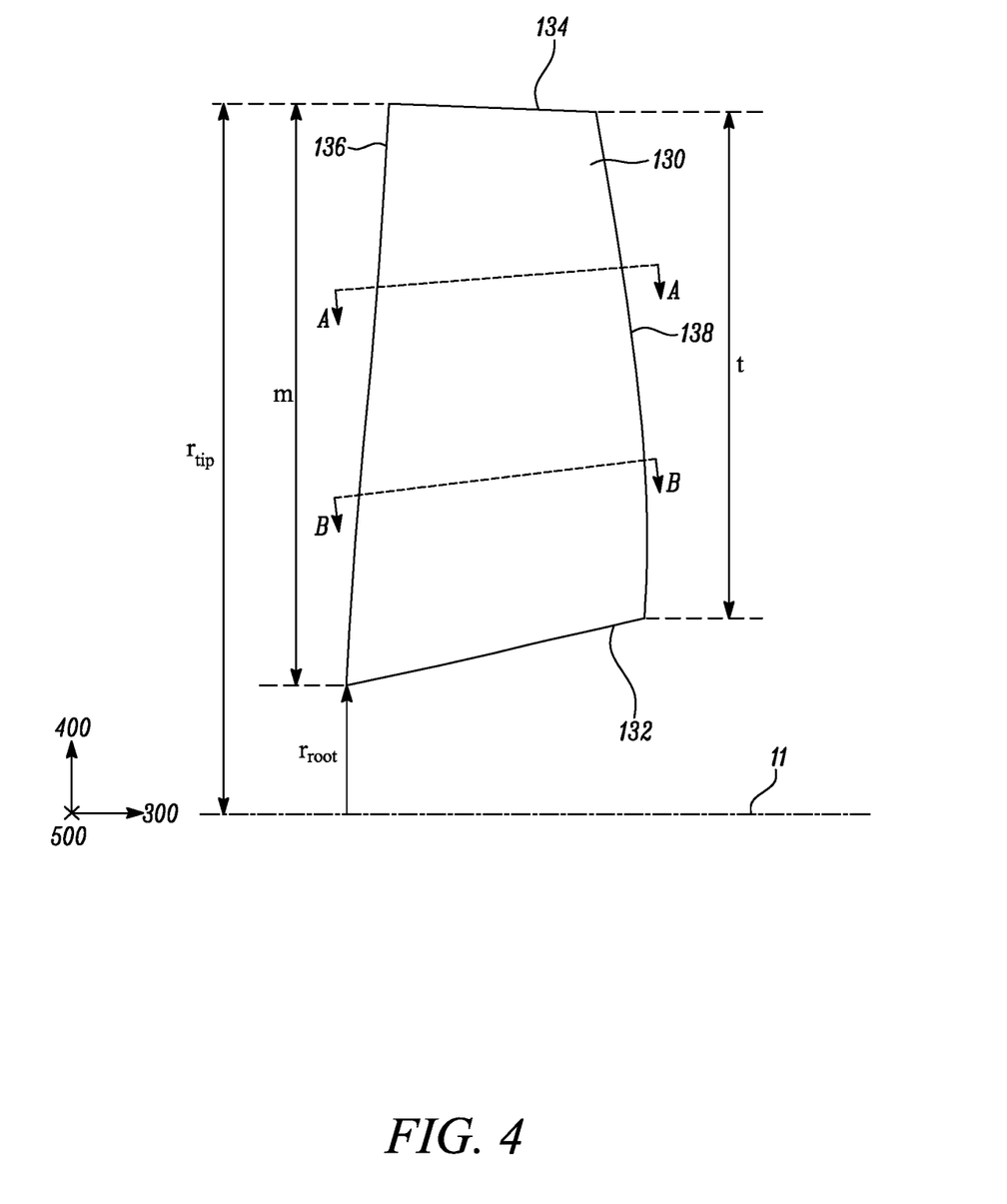
FIG. 4 is a side view of a fan blade for use with examples of the present disclosure.

FIG. 4 shows a fan blade 130 of the fan 23 in the gas turbine engine 10 in greater detail. The fan blade 130 extends from a root 132 to a tip 134 in a substantially radial spanwise direction 400. The root 132 may be defined by the radially innermost gas-washed points of the blade 130 and/or may be defined as an intersection between the fan blade 130 and a surface (for example a conical and/or cylindrical surface and/or an otherwise profiled endwall) from which the fan blades 13 extend. The fan blade 130 has a leading edge 136 and a trailing edge 138. The leading edge 136 may be defined as the line defined by the axially forwardmost points of the fan blade 130 from its root 132 to its tip 134. The fan blade 130 may (or may not) have a fixture portion (not shown) radially inboard of the root, which may be used to fix the fan blade 130 to the rest of the engine.

The radius of the leading edge 136 of the fan blade 130 at its root 132 is designated in FIG. 4 as $r_{root}$. The radius of the leading edge 136 of the fan blade 130 at its tip 134 is designated in FIG. 4 as $r_{tip}$. The ratio of the radius of the leading edge 136 of the fan blade 130 at its root 132 to the radius of the leading edge 136 of the fan blade 130 at its tip 134 ($r_{root}/r_{tip}$) may be as described and/or claimed herein, for example less than 0.35 and/or less than 0.33 and/or less than 0.28.

The span m of the blade 130 is defined as the difference in the radius of the leading edge 136 at the tip and the radius of the leading edge 136 at the root ($r_{tip}-r_{root}$).

In use of the gas turbine engine 10, the fan 23 (with associated fan blades 130) rotates about the rotational axis 9. This rotation results in the tip 134 of the fan blade 130 moving with a velocity $U_{tip}$. The work done by the fan blades 130 on the flow results in an enthalpy rise dH of the flow. Accordingly, a fan tip loading may be defined as $dH/U_{tip}^2$, where dH is the enthalpy rise (for example the 1-D average enthalpy rise) across the fan (or in the bypass stream) and $U_{tip}$ is the velocity of the fan tip (which may be defined as fan tip radius at leading edge multiplied by rotational speed). The fan tip loading at cruise conditions may be in the ranges described and/or claimed elsewhere herein.

The specific thrust of the gas turbine engine 10 may be in the ranges described and/or claimed herein.

A cross-sectional plane A-A or B-B through the blade 130 may be defined by an extrusion in the circumferential direction of a straight line formed between a point on the leading edge 136 that is at a given percentage X of the span m from the root 132 (i.e. at a radius of ($r_{root}$+X/100*($r_{tip}$−$r_{root}$))), and a point on the trailing edge that is at the same radial percentage X of a trailing edge radial extent t along the trailing edge 138 from the root 132 at the trailing edge 138. The circumferential direction of the extrusion may be taken at the leading edge position of the plane A-A, B-B. In other words, reference to a cross-section through the fan blade 130 may mean a section through the aerofoil in a plane defined by: a line that passes through the point on the leading edge that is at a given percentage of the span m along the leading edge from the leading edge root and points in the direction of the tangent to the circumferential direction at that point on the leading edge; and a point on the trailing edge that is at that same percentage along the trailing edge 138 from the trailing edge root.

Figure 5:
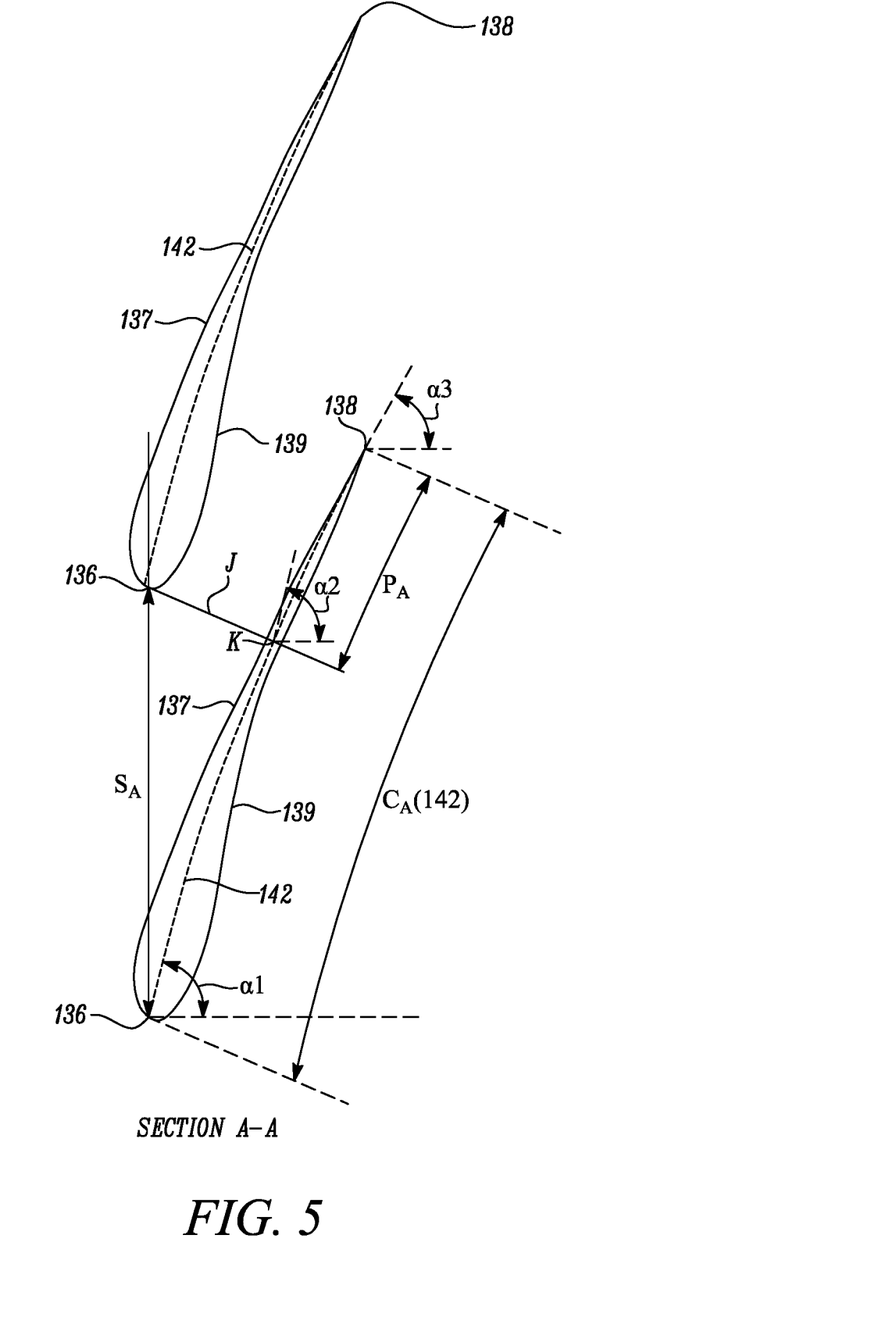
FIG. 5 is a schematic view of two neighbouring blades taken through the cross-section A-A in FIG. 2.

FIG. 5 is a schematic showing a cross-section A-A (indicated in FIG. 4) through two neighbouring fan blades 130.

The neighbouring fan blades 130 are both part of the fan 23. The neighbouring fan blades 130 may be substantially identical to each other, as in the example of FIG. 5. The spacing between the blades 130 (for example between any two equivalent points on the fan blades 130, for example a given spanwise position on their leading edges 135 and/or trailing edges 138) is indicated by the letter S. This spacing S may be referred to as the pitch of the fan blades 130. Although indicated as a straight line, in the illustrated example the spacing S is actually the circumferential distance between the two neighbouring fan blades 130, and as such may be different depending on the spanwise position of the cross-section (in particular, the spacing S typically increases with increasing spanwise position (or increasing radius)).

A camber line 142 is defined for a given cross-section as the line formed by the points in that cross-section that are equidistant from a pressure surface 139 and a suction surface 137 of the blade 130 for that cross-section. The change in the angle of the camber line 142, between any two points is simply the angle between the tangent to the camber line 142, at each of those two points.

A true chord for a given cross-section, CA, is the distance along the camber line (which would typically be a curved line) between the leading edge 136 and the trailing edge 138 of the aerofoil 130 in that cross-section. Accordingly, the true chord CA would typically be the length of a curved line. Note that this is different to what might conventionally be referred to as the chord length, which would be the length of a straight line drawn between the leading edge 136 and the trailing edge 138 of the aerofoil 130 in that cross-section (and is not shown in FIG. 5).

A covered passage is defined as the part of the blade (or part of the passage between the blades) for a given cross-section that is between a line J that passes through the point K on the suction surface 137 of the blade 130 and the leading edge 136 of the neighbouring blade 130 that is adjacent the suction surface 137. The point K is defined as the point K on the suction surface that is closest to the leading edge 136 of a neighbouring blade. The line J may pass entirely through the cross-section of the blade, so as to separate the cross-section into two parts: a covered passage part that is between the trailing edge 138 and the line J, and a non-covered passage part that is between the leading edge 136 and the line J. The line J may be described as being a straight line when viewed from a radial direction.

Note that one or both of the true chord length C and local pitch S may change depending on the spanwise position of the cross-section.

The angle of the camber line 142, (that is, the tangent to the angle of the camber line 142,) for a given cross-section A-A, changes between the leading edge 136 of the blade 130 and the trailing edge 138 of the blade 130, and also between the leading edge 136 of the blade and the point on the camber line 142 that is at the start of the covered passage P. In this regard, the start of the covered passage P may be the axially forwardmost point of the covered passage P through which the camber line 142 passes, that is the point at which the line J crosses the camber line 142. The angle of the camber line may be measured relative to any other line in the plane of the cross-section, because it is change in angle of the camber line 142 that is importance.

In the example of FIG. 5, the angle of the camber line 142 is measured relative to a line that is parallel with the axial direction 300. The difference between the angle $\alpha 1$ of the camber line 142 at the leading edge 136 and the angle $\alpha_3$ of the trailing edge 138 is simply given $|\alpha_3-\alpha_1|$. The difference between the angle $\alpha_1$ of the camber line 142 at the leading edge 136 and the angle $\alpha 2$ at the start of the covered passage P is simply given by $|\alpha_2-\alpha_1|$. Where the term change (or difference) in angle of the camber line between two points is used herein, this means the magnitude of the change (or difference) in the angle of the camber line between those two points.

It will be appreciated that the change in angle ($|\alpha_3-\alpha_1|$) of the camber line 142 between the leading edge 136 and the trailing edge 138, and that the change in angle ($|\alpha_2-\alpha_1|$) of the camber line 142 between the leading edge 136 and the start of the covered passage P are different for at least some cross-sections taken through the blade 130.

Figure 6:
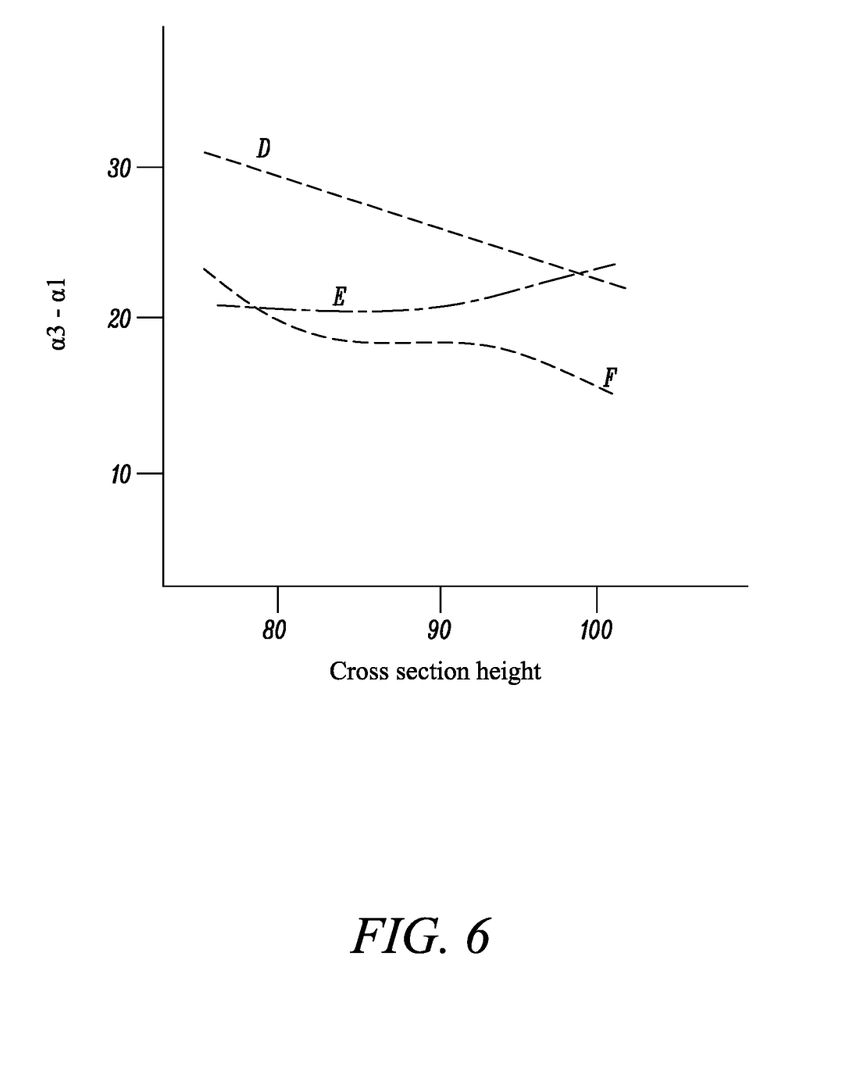
FIG. 6 is a graph showing, by way of example only, camber change between the leading edge and the trailing edge ($\alpha 3-\alpha 1$).

FIG. 6 is a graph showing three examples (lines D, E, F) of how the change in angle ($|\alpha_3-\alpha_1|$) of the camber line 142 between the leading edge 136 and the trailing edge 138 may vary with a particular cross section of the blade span through the respective blade 130. Each of the lines D, E, F represents a different fan blade 130 that may be in accordance with aspects of the present disclosure. Each point on one of the lines D, E, F shown in FIG. 6 represents the change in angle ($|\alpha_3-\alpha_1|$) for a particular cross-section through the respective blade 130.

The relationships D, E, F plotted in FIG. 6 are examples of fan blades 130 that satisfy the relationships between the cross section blade height and the change in angle of the camber line between the leading edge ($\alpha_1$) and the trailing edge ($\alpha_3$), For example at a cross section through the fan blade at a height greater than 80% of the blade span of the airfoil portion (130) the angle ($\alpha_3-\alpha_1$) of the camber line (142) between the leading edge (136) and the trailing edge (138) satisfies:

$$|\alpha_3-\alpha_1|\geq-0.5*\text{cross section percentage height}+60$$

In use, the gas turbine engine 10 may operate at the cruise conditions defined elsewhere herein. Such cruise conditions may be determined by the cruise conditions (for example the mid-cruise conditions) of an aircraft to which at least one (for example 2 or 4) gas turbine engine 10 may be mounted in order to provide propulsive thrust. Parameters such as pressure ratios referred to herein may be taken at such a cruise condition.

It will be understood that the invention is not limited to the embodiments above-described and various modifications and improvements can be made without departing from the concepts described herein.

We claim:

1. A fan blade for a gas turbine engine, the fan blade comprises:
    an airfoil portion having a leading edge extending from a root to a tip, the fan blade has a radial span (m) extending between the leading edge at the root at a 0% span position and to the leading edge at the tip at a 100% span position;
    a camber line defined by the midpoint between its pressure surface and its suction surface, with a true chord (C) being defined as the distance along the camber line between the leading edge and a trailing edge of the fan blade; and a covered passage defined as the portion of the cross-section between the trailing edge and a line (J) passing through a point (K) on the suction surface that is closest to the leading edge of a neighbouring fan blade and the leading edge of that neighbouring fan blade;

wherein:

at the cross section through the fan blade at the point 80% of the blade span of the airfoil portion the change in angle ($\alpha 3-\alpha 1$) of the camber line between the leading edge and the trailing edge satisfies:

$|\alpha 3-\alpha 1|>20°$ and at a cross section through the fan blade at a point 80% of the blade span of the airfoil portion the change in angle ($\alpha 2-\alpha 1$) of the camber line between the leading edge and the point on the camber line that corresponds to the start of the covered passage satisfies:

$|\alpha 2-\alpha 1|>7°$ and at a cross section through the fan blade at a height greater than 80% of the blade span of the airfoil portion the angle ($\alpha 3-\alpha 1$) of the camber line between the leading edge and the trailing edge satisfies:

$-0.4°*$cross section percentage height$+64°\geq|\alpha 3-\alpha 1|\geq-0.3°*$cross section percentage height$+44°$.

2. The fan blade of claim 1, wherein at the cross section through the fan blade at the point 80% of the blade span of the airfoil portion the change in angle ($\alpha 3-\alpha 1$) of the camber line between the leading edge and the trailing edge satisfies: $32°>|\alpha 3-\alpha 1|>20°$.

3. The fan blade of claim 1, wherein at the cross section through the fan blade at the point 80% of the blade span of the airfoil portion the change in angle ($\alpha 3-\alpha 1$) of the camber line between the leading edge and the trailing edge satisfies: $29°>|\alpha 3-\alpha 1|>20°$.

4. The fan blade of claim 1, wherein at the cross section through the fan blade at the point 80% of the blade span of the airfoil portion the change in angle ($\alpha 2-\alpha 1$) of the camber line between the leading edge and the point on the camber line that corresponds to the start of the covered passage satisfies: $15°>|\alpha 2-\alpha 1|>7°$.

5. The fan bade of claim 1, wherein at the cross section through the fan blade at the point 80% of the blade span of the airfoil portion the change in angle ($\alpha 2-\alpha 1$) of the camber line between the leading edge and the point on the camber line that corresponds to the start of the covered passage satisfies: $10°>|\alpha 2-\alpha 1|>7°$.

6. A gas turbine engine for an aircraft, the gas turbine engine comprising:

an engine core comprising a turbine, a compressor, and a core shaft connecting the turbine to the compressor;

a fan located upstream of the engine core, the fan comprising a plurality of fan blades according to claim 1; and a gearbox that receives an input from the core shaft and outputs drive to the fan so as to drive the fan at a lower rotational speed than the core shaft.

7. The gas turbine engine of claim 6, wherein the ratio of the radius of the fan blade at the root ($r_{root}$) to the radius of the fan blade at the tip ($r_{tip}$) is less than 0.33.

8. The gas turbine engine of claim 6, wherein:

the turbine is a first turbine, the compressor is a first compressor, and the core shaft is a first core shaft;

the engine core further comprises a second turbine, a second compressor, and a second core shaft connecting the second turbine to the second compressor; and the second turbine, second compressor, and second core shaft are arranged to rotate at a higher rotational speed than the first core shaft.

9. The gas turbine engine of claim 6, wherein the fan diameter is greater than 250 cm.

10. The gas turbine engine of claim 6, wherein a bypass ratio is defined as the ratio of the mass flow rate of a bypass flow (B) that flows along a bypass duct to the mass flow rate of the core flow (A) at cruise conditions, and the bypass ratio is greater than 10.

11. The gas turbine engine of claim 6, wherein the specific thrust at cruise conditions is less than 100 $NKg^{-1}s^{-1}$.

* * * * *